(12) United States Patent
Wang (10) Patent No.: US 12,411,012 B2
(45) Date of Patent: Sep. 9, 2025

(54) LOCALIZATION METHOD, WEARABLE DEVICE AND NON-TRANSITORY COMPUTER READABLE STORAGE MEDIUM

(71) Applicant: HTC Corporation, Taoyuan (TW)

(72) Inventor: Yu-Tzu Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 188 days.

(21) Appl. No.: 18/363,753

(22) Filed: Aug. 2, 2023

(65) Prior Publication Data

US 2025/0044103 A1    Feb. 6, 2025

(51) Int. Cl.
| G06F 3/01 | (2006.01) |
| G01C 21/20 | (2006.01) |
| G06K 7/14 | (2006.01) |
| H04L 67/55 | (2022.01) |

(52) U.S. Cl.
CPC ........... *G01C 21/206* (2013.01); *G06F 3/012* (2013.01); *G06K 7/1417* (2013.01); *H04L 67/55* (2022.05)

(58) Field of Classification Search
CPC ....... G01C 21/206; G06F 3/011; G06F 3/012; G06F 3/014; G06F 3/016; G06F 3/017; G06K 7/1417; G06K 17/00; H04L 67/55; G06T 7/246; G06T 17/05
See application file for complete search history.

(56) References Cited

U.S. PATENT DOCUMENTS

| 9,014,970 | B2 * | 4/2015 | Oi ....................... G06F 16/2379 |
| | | | 701/450 |
| 10,338,392 | B2 * | 7/2019 | Kohler ..................... G06F 3/017 |
| 10,600,252 | B2 * | 3/2020 | Bhatnagar ............... G06F 3/011 |
| 2012/0249741 | A1 * | 10/2012 | Maciocci .............. G06T 19/006 |
| | | | 348/51 |
| 2023/0222679 | A1 * | 7/2023 | Chen ......................... G06T 7/70 |
| | | | 382/154 |
| 2024/0412408 | A1 * | 12/2024 | Tsurumi .................... G06T 7/75 |

FOREIGN PATENT DOCUMENTS

CN            116416320  A        7/2023

OTHER PUBLICATIONS

The office action of the corresponding Taiwanese application No. TW113107265 issued on Aug. 7, 2024.

* cited by examiner

*Primary Examiner* — Vijay Shankar
(74) *Attorney, Agent, or Firm* — CKC & Partners Co., LLC (57) ABSTRACT

The present disclosure provides localization method and wearable device. The localization method is applicable to the wearable device, and includes: obtaining an environment information related to an environment where the wearable device is; determining a target map area in a map of the environment according to the environment information; and locating the wearable device in the map of the environment according to the target map area.

18 Claims, 6 Drawing Sheets

LOCALIZATION METHOD, WEARABLE DEVICE AND NON-TRANSITORY COMPUTER READABLE STORAGE MEDIUM

BACKGROUND

Field of Invention

This disclosure relates to a method and device, and in particular to a localization method and wearable device.

Description of Related Art

In the applications of virtual reality (VR), augmented reality (AR) and/or mixed reality (MR), some of operating environments of the head-mounted device, such as department store, are complicated. When the head-mounted device performs object detection to recognize those operating environments, the object detection might fail, which does not facilitate the localization of the head-mounted device. Some related arts further set up specific areas in those operating environments by using fences or walls or by simplifying some areas, and limit the head-mounted device to be operated in the specific areas. However, the related arts which set up the specific areas in those operating environments are not convenience for the applications.

SUMMARY

An aspect of present disclosure relates to a localization method applicable to a wearable device. The localization method includes: obtaining an environment information related to an environment where the wearable device is; determining a target map area in a map of the environment according to the environment information; and locating the wearable device in the map of the environment according to the target map area.

Another aspect of present disclosure relates to a wearable device. The wearable device includes an environment information collector and a processor. The environment information collector is configured to collect an environment information related to an environment where the wearable device is. The processor is coupled to the environment information collector, is configured to determine a target map area in a map of the environment according to the environment information, and is configured to locate the wearable device in the map of the environment according to the target map area.

Another aspect of present disclosure relates to a non-transitory computer readable storage medium with a computer program to execute a localization method applicable to a wearable device. The localization method includes: obtaining an environment information related to an environment where the wearable device is; determining a target map area in a map of the environment according to the environment information; and locating the wearable device in the map of the environment according to the target map area.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
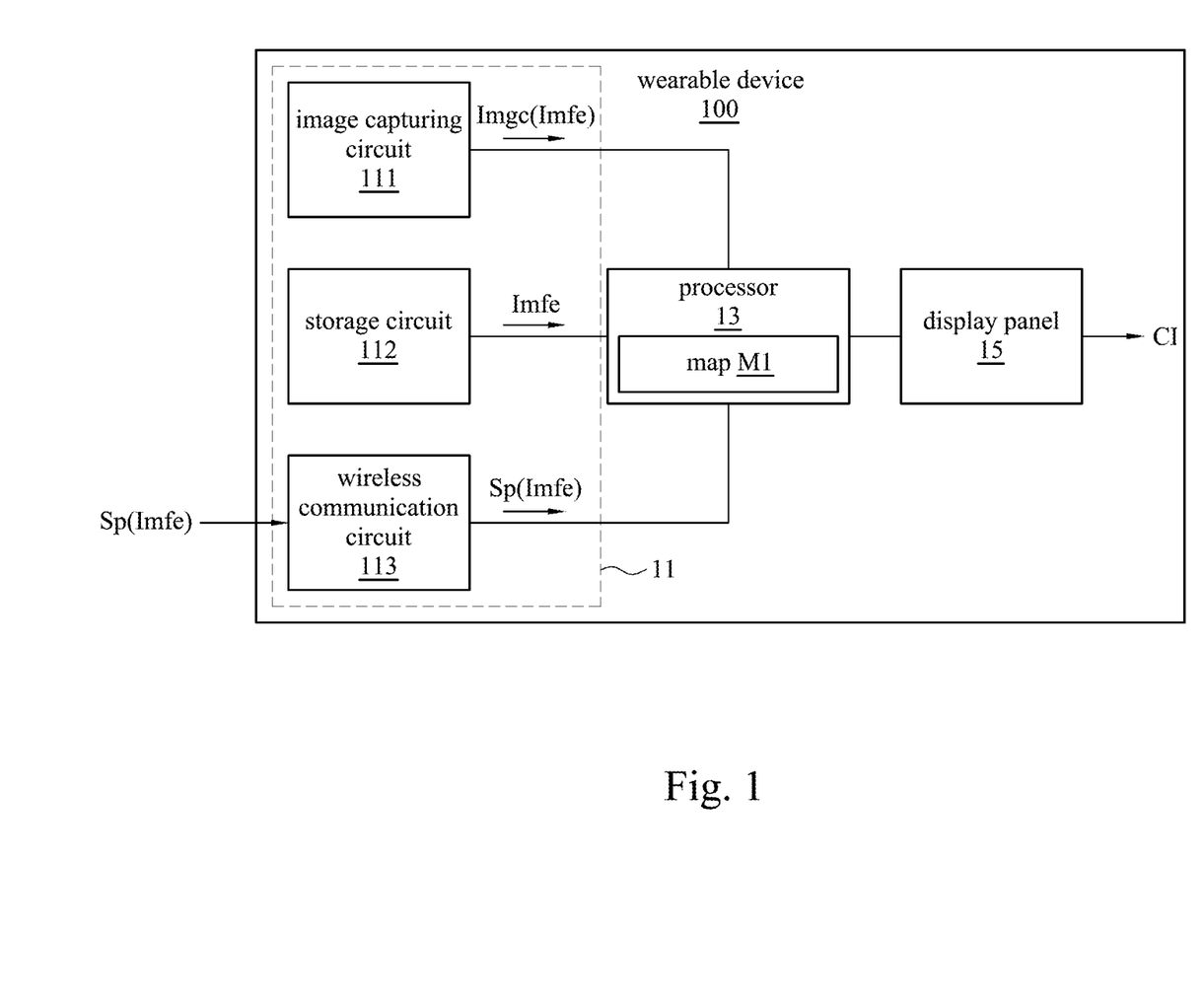
FIG. 1 is a block diagram of a wearable device in accordance with some embodiments of the present disclosure.

Referring to FIG. 1, FIG. 1 is a block diagram of a wearable device 100 in accordance with some embodiments of the present disclosure. In some embodiments, the wearable device 100 is a head-mounted device (HMD). Thus, the wearable device 100 can be mounted on head of a user in a physical environment such as a public place, a gaming place, a workplace, etc. The wearable device 100 mounted on the head of the user can provide an immersive content CI for the user.

In some embodiments, the wearable device 100 might occlude the direct visibility of the user to the physical environment, and the immersive content CI can correspondingly be a virtual reality (VR) environment, or a mixed reality (MR) environment. In particular, the MR environment simulates the physical environment and enables an interaction of virtual reality objects (which cannot be directly seen in the physical environment by the user) with the simulated physical environment. However, the present disclosure is not limited herein. For example, the immersive content CI can be the simulated physical environment without the virtual reality objects, which is also known as a pass-through view.

In some embodiments, the wearable device 100 does not occlude the direct visibility of the user to the physical environment, and the immersive content CI can correspondingly be an augmented reality (AR) environment. In particular, the AR environment augments the physical environment directly seen by the user with the virtual reality objects.

As should be understood, the user might control the virtual reality objects in the immersive content CI by operating at least one controller (not shown) or by making hand movements. In particular, the at least one controller is wirelessly connected to the wearable device 100, and the hand movements would be sensed and recognized by the wearable device 100.

In some embodiments, as shown in FIG. 1, the wearable device 100 includes an environment information collector 11, a processor 13 and a display panel 15. The processor 13 is electrically coupled to the environment information collector 11 and the display panel 15.

In accordance with the embodiments that the user operates the wearable device 100 in the physical environment, the environment information collector 11 is configured to collect environment information Imfe related to the physical environment where the wearable device 100 is. In some practical applications, the physical environment is a tall building such as a department store. The environment information Imfe related to the tall building might correspondingly include multiple environment parameters such as levels of the tall building, current level, floor-to-ceiling height of each level, area of each level, equipment and/or facility (e.g., toilet, information center, elevator) in each level, specific regions (e.g., restricted area, food court, parking lot) in the tall building, etc. It should be understood that the environment information Imfe can be pre-generated by management personnel of the physical environment. In addition, the environment information Imfe can be arranged in the physical environment in various manners or can be pre-provided to the wearable device 100, which would be described in detail later.

In the embodiments of FIG. 1, the environment information collector 11 includes an image capturing circuit 111, a storage circuit 112 and a wireless communication circuit 113. The image capturing circuit 111, the storage circuit 112 and the wireless communication circuit 113 are electrically coupled to the processor 13.

In some embodiments, the image capturing circuit 111 is configured to capture images in the physical environment. In particular, the image capturing circuit 111 can be implemented by at least one camera device or other structure including multiple components such as lens, image sensor, image processor, etc.

In some embodiments, the storage circuit 112 is configured to store signals, data and/or information required by the operation of the wearable device 100. In particular, the storage circuit 112 can be implemented by volatile memory, non-volatile memory, or the both.

In some embodiments, the wireless communication circuit 113 is configured to be communicatively coupled to other communication devices (not shown). In particular, the wireless communication circuit 113 can be communication device implemented by Bluetooth low energy (BLE), wireless local area network (e.g., Wi-Fi), mobile communication (e.g., 4G, 5G, etc.) or other suitable technologies. It can be seen that the wireless communication circuit 113 can wirelessly communicate with the other communication devices with or without a network provided by internet service provider (ISP).

In some embodiments, by utilizing one or more technologies such as Simultaneous Localization and Mapping (SLAM), the processor 13 can generate a map M1 of the physical environment and calculate location of the wearable device 100 in the map M1. In the case that the physical environment is a tall building, the map M1 might have a great amount of data, which might cause processing resources (e.g., memory usage) of the processor 13 being significantly occupied during calculation of the location of the wearable device 100. In addition, because the map M1 having the great amount of data might show a noticeable deviation from the tall building, the location of the wearable device 100 in the map M1 being calculated with the map M1 having the great amount of data might have poor precision. In view of these, in some further embodiments, the processor 13 uses the environment information Imfe collected by the environment information collector 11 to determine a target map area (which would be described later) in the map M1, and calculates the location of the wearable device 100 in the map M1 with the target map area. In particular, the processor 13 can be implemented by central processing unit (CPU), graphic processing unit (GPU), application-specific integrated circuit (ASIC), microprocessor, system on a Chip (SoC) or other suitable processing circuits.

In some embodiments, the display panel 15 is configured to display one or more images transmitted from the processor 13. In such arrangements, when the display panel 15 displays the images, the user wearing the wearable device 100 can view and perceive the immersive content CI by looking at visual contents on screens of the display panel 15. In particular, the display panel 15 can be implemented by an active-matrix organic light-emitting diode (AMOLED) display, or the likes.

Figure 2:
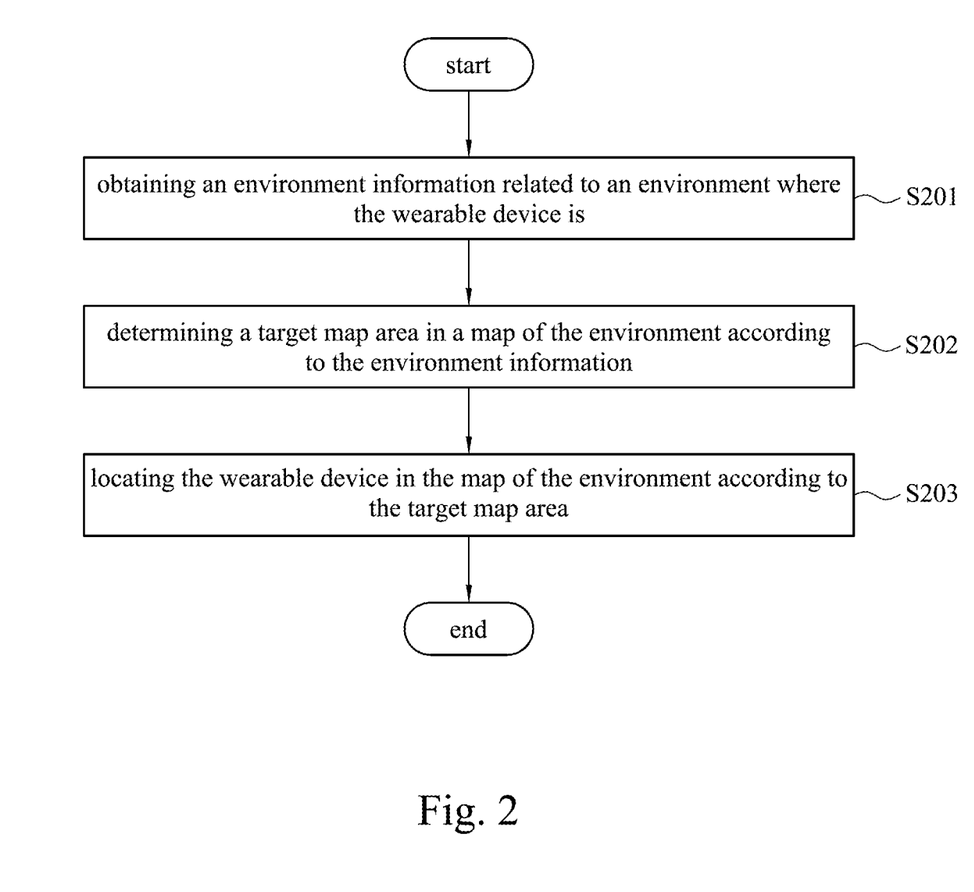
FIG. 2 is a flow diagram of a localization method in accordance with some embodiments of the present disclosure.

The operation of the wearable device 100 would be described in detail with reference to FIG. 2. Referring to FIG. 2, FIG. 2 is a flow diagram of a localization method 200 in accordance with some embodiments of the present disclosure. The localization method 200 can be performed by the wearable device 100 of FIG. 1, but the present disclosure should not be limited herein. In some embodiments, as shown in FIG. 2, the localization method 200 includes operations S201-S203.

In operation S201, the wearable device 100 obtains the environment information Imfe related to an environment (i.e., the physical environment) where the wearable device 100 is. The operation S201 would be described in detail below with reference to FIG. 3.

Figure 3:
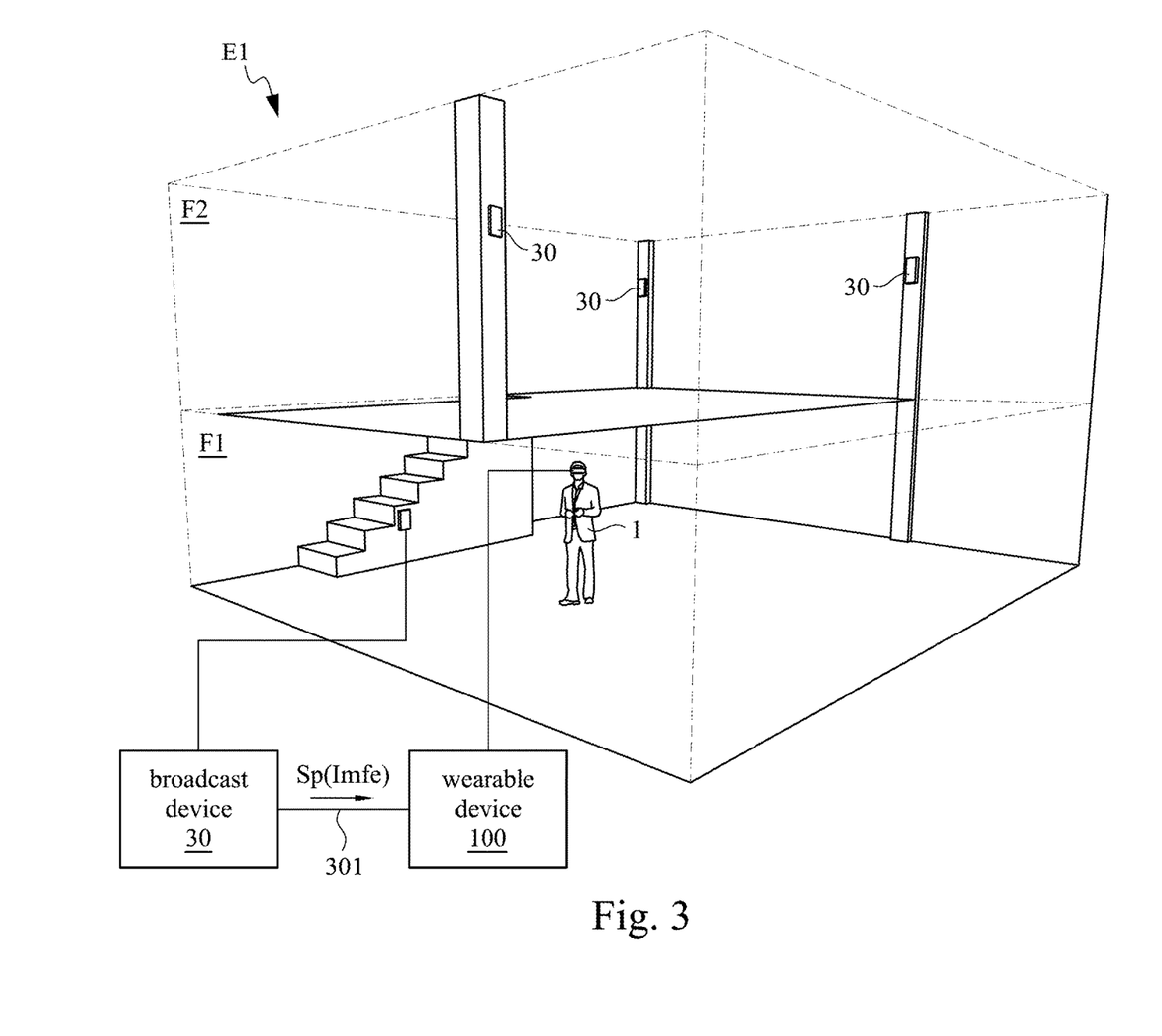
FIG. 3 is a schematic diagram of an environment where the wearable device is in accordance with some embodiments of the present disclosure.

Referring to FIG. 3, FIG. 3 is a schematic diagram of the environment E1 in accordance with some embodiments of the present disclosure. In some embodiments, as shown in FIG. 3, the environment E1 includes an environment area F1 and an environment area F2. For example, the environment area F1 is a first floor of the tall building, and the environment area F2 is a second floor of the tall building. Moreover, multiple broadcast devices 30 are arranged in the environment E1. For example, as shown in FIG. 3, one of the broadcast devices 30 is arranged on a stair in the environment area F1 of the environment E1, and others of the broadcast devices 30 are arranged on multiple columns in the environment area F2 of the environment E1.

In the embodiments of FIG. 3, an operator 1 (i.e. the user) of the wearable device 100 is in the vicinity of the broadcast device 30 arranged on the stair. In such case, the wearable device 100 uses the wireless communication circuit 113 to establish a wireless connection 301 with the broadcast device 30 arranged on the stair. In accordance with the above embodiments that the environment information Imfe is arranged in the physical environment, the environment information Imfe is stored in each of the broadcast devices 30. After the wireless connection 301 is established, the broadcast device 30 arranged on the stair transmits a push signal Sp carrying the environment information Imfe to the wearable device 100 through the wireless connection 301. As shown in FIG. 1, the wireless communication circuit 113 of the wearable device 100 receives the push signal Sp from the broadcast device 30 arranged on the stair, and transmits the push signal Sp to the processor 13, so that the processor 13 obtains the environment information Imfe.

In the above embodiments, the environment information Imfe is stored in the broadcast device 30, and is carried by the push signal Sp transmitted from the broadcast device 30 to the wearable device 100. However, the present disclosure is not limited herein. For example, in some embodiments, the environment information Imfe is stored in a physical server (not shown) in the environment E1. In some further embodiments, the broadcast device 30 can download the environment information Imfe from the physical server via the network, so as to transmit the push signal Sp carrying the environment information Imfe. Moreover, in some further embodiments, after receiving the push signal Sp, the processor 13 can control the wireless communication circuit 113 to download the environment information Imfe from the physical server via the network.

In operation S202, the processor 13 of the wearable device 100 determines the target map area in the map M1 of the environment E1 according to the environment information Imfe. The operation S202 would be described in detail below with reference to FIG. 4.

Figure 4:
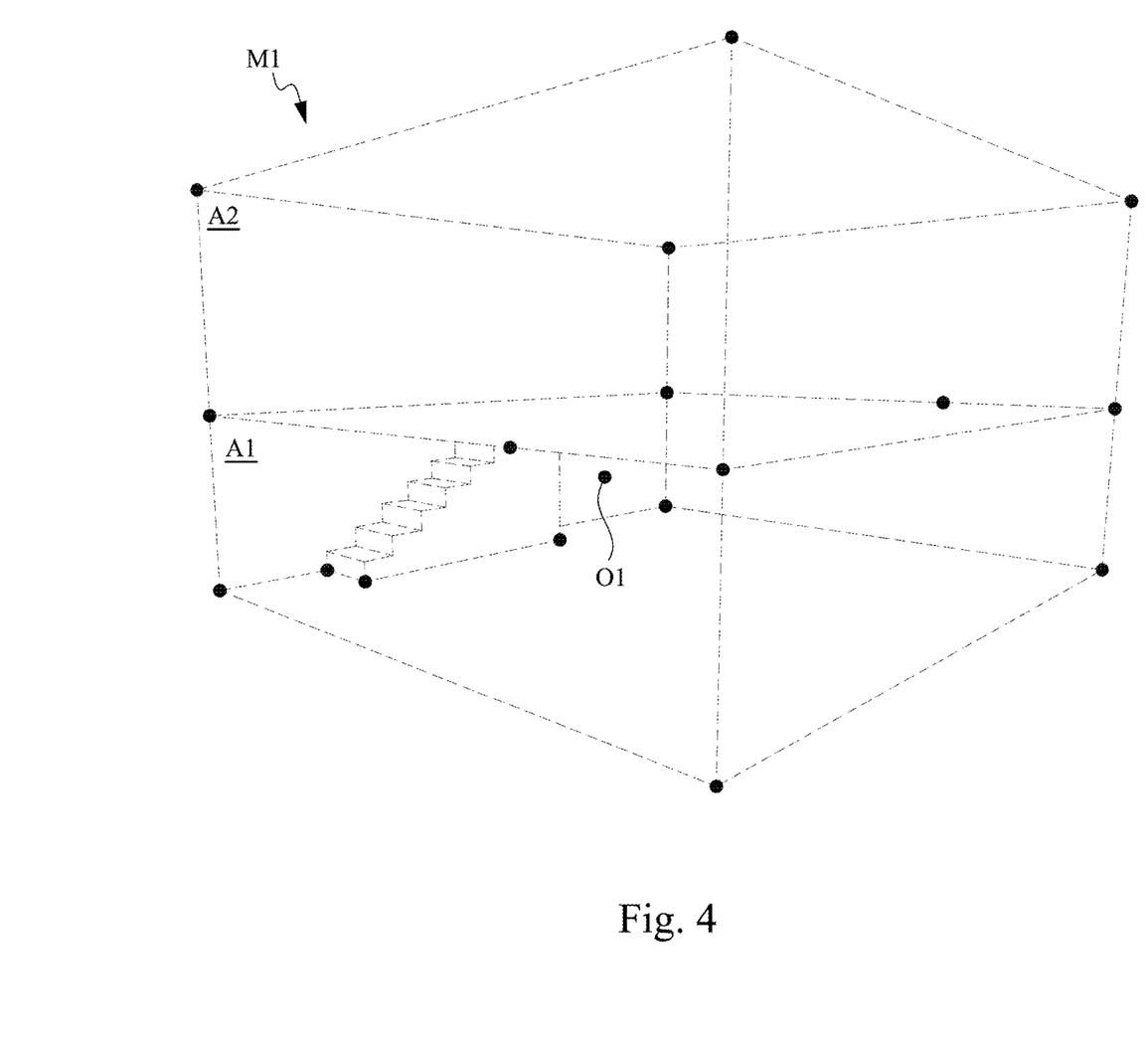
FIG. 4 is a schematic diagram of a map of the environment of FIG. 3 in accordance with some embodiments of the present disclosure.

Referring to FIG. 4, FIG. 4 is a schematic diagram of the map M1 of the environment E1 in FIG. 3 in accordance with some embodiments of the present disclosure. In some embodiments, as shown in FIG. 4, the map M1 includes a map area A1 and a map area A2. As can be seen from FIGS. 3 and 4, the map area A1 is corresponding to the environment area F1, and the map area A2 is corresponding to the environment area F2.

In accordance with the above embodiments that the processor 13 obtains the environment information Imfe by receiving the push signal Sp transmitted by the broadcast device 30 arranged on the stair, the environment information Imfe obtained by receiving the push signal Sp transmitted by the broadcast device 30 arranged on the stair indicates that the current level of the tall building is the first floor (i.e., the environment area F1 of the environment E1). Accordingly, the processor 13 identifies the map area A1 corresponding to the environment area F1 in the map M1, and regards the map area A1 as the target map area. As can be seen from the embodiments of FIGS. 3 and 4, the processor 13 is configured to identify one of the map areas (i.e., the map area A1, the map area A2) in the map M1 based on the environment information Imfe, and is configured to regard the one of the map areas in the map M1 as the target map area.

In operation S203, the processor 13 of the wearable device 100 locates the wearable device 100 in the map M1 of the environment E1 according to the target map area. In some embodiments, the processor 13 controls the image capturing circuit 111 to capture images (not shown) of the environment area F1, and uses SLAM technology to analyze both the images of the environment area F1 and the map area A1 (i.e., the target map area), so as to locate the wearable device 100 in the map M1. By SLAM technology, the processor 13 extracts multiple feature points (not shown) from the images of the environment area F1, matches the feature points to multiple map points in the map area A1, and calculates a point O1 in the map M1 according to a result of match. In FIG. 4, the point O1 represents the location of the wearable device 100 in map M1 of the environment E1.

As can be seen from the above embodiments of FIG. 3, in some embodiments, the wearable device 100 uses the wireless communication circuit 113 to obtain the environment information Imfe. However, the way of obtaining the environment information Imfe (i.e., operation S201) is not limited thereto, which would be described in detail below with reference to FIG. 5.

Figure 5:
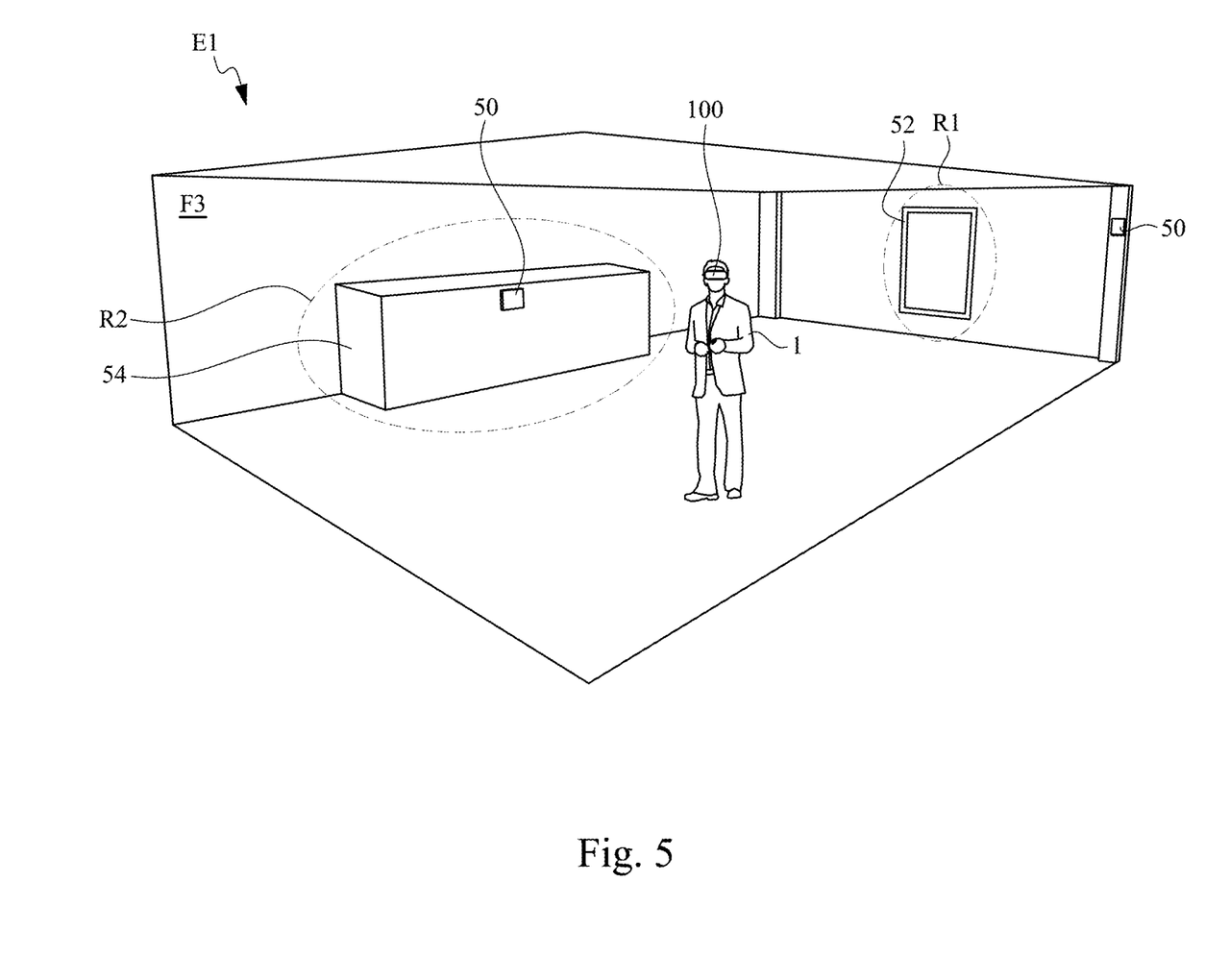
FIG. 5 is a schematic diagram of an environment where the wearable device is in accordance with some embodiments of the present disclosure.

Referring to FIG. 5, FIG. 5 is a schematic diagram of the environment E1 in accordance with some embodiments of the present disclosure. In some embodiments, as shown in FIG. 5, the environment E1 includes an environment area F3, and the environment area F3 includes an environment sub-area R1 and an environment sub-area R2. For example, the environment area F3 is one floor of the tall building, and the environment sub-area R1 and the environment sub-area R2 are two areas within that floor of the tall building. Moreover, multiple two-dimensional (2D) codes 50 are arranged in the environment E1. As shown in FIG. 5, the environment sub-area R1 is provided with a reflective object 52 (e.g., mirror), and the environment sub-area R2 is provided with a counter 54. One of the 2D codes 50 is arranged on a column beside the reflective object 52 in the environment area F3 of the environment E1, and the other of the 2D codes 50 are arranged on the counter 54 in the environment area F3 of the environment E1. In some embodiments, the environment sub-area R1 and the environment sub-area R2 can be referred as the environment area R1 and the environment area R2.

In accordance with the above embodiments that the environment information Imfe is arranged in the physical environment, each of the 2D code 50 records the environment information Imfe. In particular, the 2D code can be implemented by QR code, or the likes.

In the embodiments of FIG. 5, the operator 1 of the wearable device 100 is in the vicinity of the 2D code 50 arranged on the counter 54. In such case, the wearable device 100 uses the image capturing circuit 111 to scan the 2D code 50 arranged on the counter 54. For example, the image capturing circuit 111 captures at least one image including the 2D code 50, and recognizes and cuts off the 2D code 50 from that image, so as to output an image Imgc of the 2D code 50. It should be understood that the image Imgc of the 2D code 50 also records the environment information Imfe. As shown in FIG. 1, the processor 13 receives the image Imgc of the 2D code 50, and decodes the 2D code 50 to obtain the environment information Imfe. The descriptions of decoding the 2D code 50 is well known to person skilled in the art of the present disclosure, and therefore are omitted herein.

In accordance with the descriptions of operation S202, the processor 13 determines the target map area in the map M1 of the environment E1 according to the environment information Imfe obtained by decoding the 2D code 50, which would be described in detail below with reference to FIG. 6.

Figure 6:
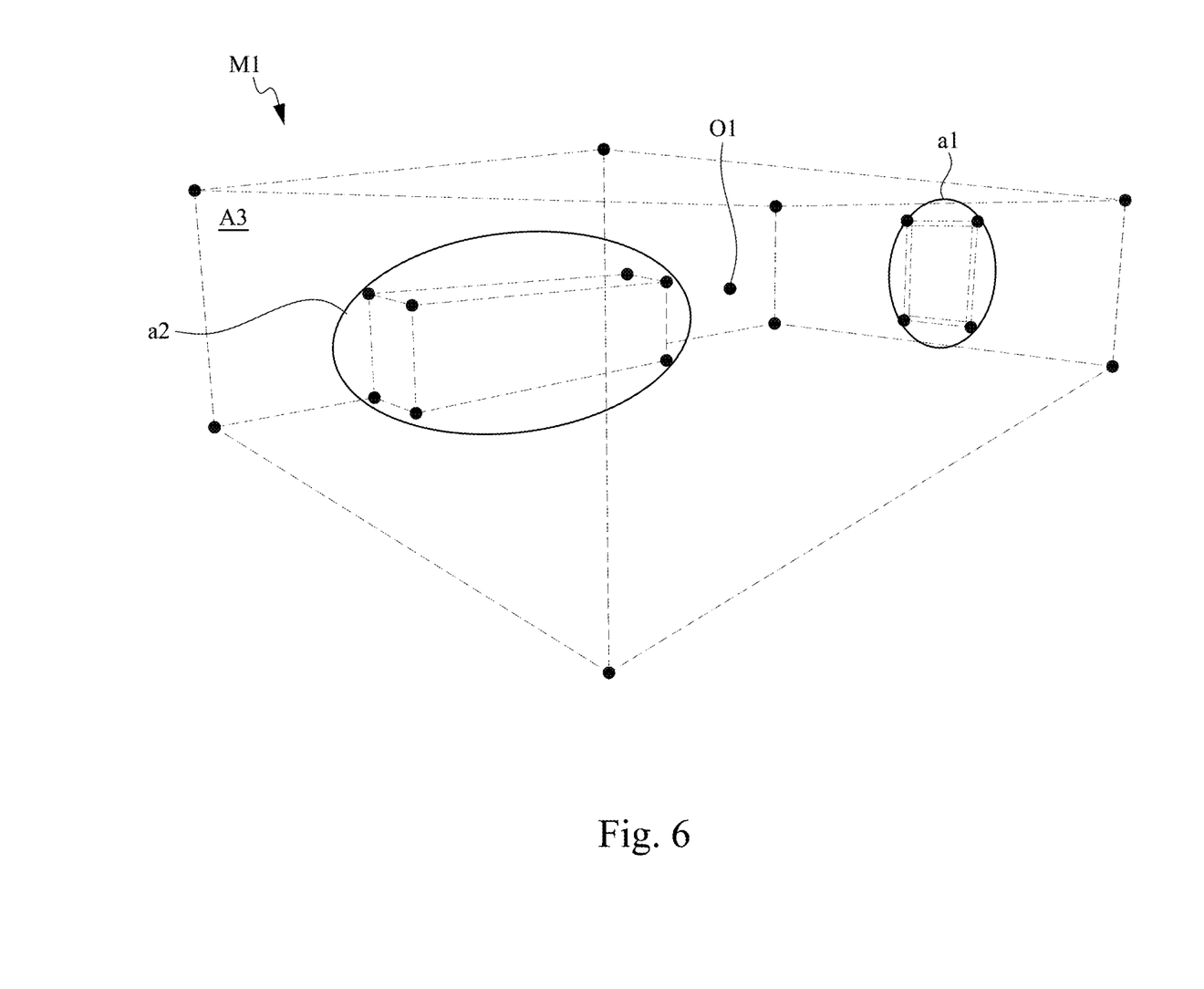
FIG. 6 is a schematic diagram of a map of the environment of FIG. 5 in accordance with some embodiments of the present disclosure.

Referring to FIG. 6, FIG. 6 is a schematic diagram of the map M1 of the environment E1 in FIG. 5 in accordance with some embodiments of the present disclosure. In some embodiments, as shown in FIG. 6, the map M1 includes a map area A3, and the map area A3 includes a map sub-area a1 and a map sub-area a2 at least. As can be seen from FIGS. 5 and 6, the map area A3 is corresponding to the environment area F3, the map sub-area a1 is corresponding to the environment sub-area R1, and the map sub-area a2 is corresponding to the environment sub-area R2. In some embodiments, the map sub-area a1 and the map sub-area a2 can be referred as the map area a1 and the map area a2.

In accordance with the above embodiments that the processor 13 obtains the environment information Imfe by decoding the 2D code 50, the environment information Imfe obtained by decoding the 2D code 50 indicates that the environment sub-area R1 is provided with the reflective object 52. Accordingly, the processor 13 identifies the map sub-area a1 corresponding to the environment sub-area R1 in the map M1, and regards the map area A3 from which the map sub-area a1 is excluded as the target map area. As can be seen from the embodiments of FIGS. 5 and 6, the processor 13 is configured to identify one of the map areas (i.e., the map sub-area a1) in the map M1 based on the environment information Imfe, and is configured to regard others of the map areas in the map M1 as the target map area. The descriptions that the processor 13 locates the wearable device 100 in the map M1 of FIG. 6 according to the target map area (i.e., the map area A3 from which the map sub-area a1 is excluded) are similar to those of operation S203, and therefore are omitted herein.

Furthermore, the way of obtaining the environment information Imfe is not limited to receiving the push signal Sp transmitted by the broadcast device 30 (i.e., the embodiments of FIG. 3) and decoding the 2D code 50 (i.e., the embodiments of FIG. 5). For example, in some embodiments, the management personnel of the environment E1 might pre-store the environment information Imfe in the storage circuit 112, and provide the wearable device 100 to the operator 1. In such arrangement, as shown in FIG. 1, the processor 13 can access the environment information Imfe from the storage circuit 112.

In some embodiments, the environment information Imfe indicates that the environment area F2 in the environment E1 of FIG. 3 is a restricted area. For example, the restricted area can be clean area, employee area, construction area, etc. As shown in FIGS. 3 and 4, the environment area F2 is corresponding to the map area A2. Accordingly, the processor 13 controls the display panel 15 to generate a warning message (not shown) corresponding to the map area A2 in the immersive content CI. In particular, the warning message is configured to inform the operator 1 that the restricted area exists in the environment E1.

It should be understood that the localization method 200 of the present disclosure is not limited to operations S201-S203 shown in FIG. 2. For example, in some embodiments, before operation S202, the localization method 200 further includes operation of generating the map M1 of the environment E1. The descriptions of generating the map M1 of the environment E1 is similar to those of the above embodiments, and therefore are omitted herein.

In the embodiments of FIG. 3, the wearable device 100 uses the wireless communication circuit 113 to receive the push signal Sp transmitted by the broadcast device 30, so as to obtain the environment information Imfe. In such arrangements, the image capturing circuit 111 and the storage circuit 112 can be omitted from the environment information collector 11.

In the embodiments of FIG. 5, the wearable device 100 uses the image capturing circuit 111 to scan the 2D code 50, so as to obtain the environment information Imfe. In such arrangements, the storage circuit 112 and the wireless communication circuit 113 can be omitted from the environment information collector 11.

In the embodiments that the wearable device 100 uses the storage circuit 112 to pre-store the environment information Imfe, the image capturing circuit 111 and the wireless communication circuit 113 can be omitted from the environment information collector 11.

In sum, the components in the wearable device 100 can be increased or decreased according to the actual applications.

As can be seen from the above embodiments of the present disclosure, by obtaining the environment information Imfe related to the environment E1 where the wearable device 100 is to determine the target map area in the map M1 of the environment E1, the processor 13 of the wearable device 100 can only load the target map area for calculating the location of the wearable device 100. In such way, the occupation of the processing resources of the processor 13 can be reduced during the calculation of the location of the wearable device 100. In sum, the wearable device 100 and the localization method 200 of the present disclosure has advantage of rapid and accurate localization, improved performance, etc.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A localization method applicable to a wearable device, and comprising:
   obtaining an environment information related to an environment where the wearable device is;
   determining a target map area in a map of the environment comprising a plurality of map areas according to the environment information, which comprises:
      identifying one of the plurality of map areas based on the environment information; and
      regarding others of the plurality of map areas as the target map area; and
   locating the wearable device in the map of the environment by only using the target map area.

2. The localization method of claim 1, wherein obtaining the environment information related to the environment where the wearable device is comprises:
   by an image capturing circuit of the wearable device, scanning at least one two-dimensional code in the environment; and
   by a processor of the wearable device, decoding the at least one two-dimensional code to obtain the environment information.

3. The localization method of claim 1, wherein the environment information is prestored in a storage circuit of the wearable device, and obtaining the environment information related to the environment where the wearable device is comprises:
   by a processor of the wearable device, accessing the environment information from the storage circuit.

4. The localization method of claim 1, wherein obtaining the environment information related to the environment where the wearable device is comprises:
   by a wireless communication circuit of the wearable device, establishing a wireless connection with at least one broadcast device;
   by the wireless communication circuit, receiving at least one push signal transmitted by the at least one broadcast device through the wireless connection; and
   by a processor of the wearable device, receiving the at least one push signal from the wireless communication circuit to obtain the environment information.

5. The localization method of claim 1, wherein determining the target map area in the map of the environment according to the environment information comprises:
   regarding the one of the plurality of map areas or others of the plurality of map areas as the target map area.

6. The localization method of claim 1, wherein the environment information indicates that an environment area in the environment corresponding to the one of the plurality of map areas is provided with at least one reflective object.

7. The localization method of claim 1, wherein when the environment information indicates that an environment area in the environment corresponding to one of the plurality of map areas in the map of the environment is a restricted area, the localization method further comprises:
   generating a warning message corresponding to the one of the plurality of map areas in an immersive content.

8. The localization method of claim 1, wherein before determining the target map area in the map of the environment according to the environment information, the localization method further comprises:
   generating the map of the environment.

9. A wearable device, comprising:
   an environment information collector, configured to collect an environment information related to an environment where the wearable device is; and
   a processor, coupled to the environment information collector, configured to:
      determine a target map area in a map of the environment comprising a plurality of map areas according to the environment information, which comprises:
         identifying one of the plurality of map areas based on the environment information, and regarding others of the plurality of map areas as the target map area; and
      locate the wearable device in the map of the environment by only using the target map area.

10. The wearable device of claim 9, wherein the environment information collector comprises:
   an image capturing circuit, coupled to the processor, and configured to scan at least one two-dimensional code in the environment, wherein the at least one two-dimensional code records the environment information;
   wherein the processor is configured to decode the at least one two-dimensional code to obtain the environment information.

11. The wearable device of claim 9, wherein the environment information collector comprises:
   a storage circuit, coupled to the processor, and configured to store the environment information;
   wherein the processor is configured to access the environment information from the storage circuit.

12. The wearable device of claim 9, wherein the environment information collector comprises:
   a wireless communication circuit, coupled to the processor, configured to establish a wireless connection with at least one broadcast device, and configured to receive at least one push signal transmitted by the at least one broadcast device through the wireless connection, wherein the at least one push signal carries the environment information;
   wherein the processor is configured to receive the at least one push signal from the wireless communication circuit to obtain the environment information.

13. The wearable device of claim 9, wherein the processor is configured to regard the one of the plurality of map areas or others of the plurality of map areas as the target map area.

14. The wearable device of claim 9, wherein the environment information indicates that an environment area in the environment corresponding to the one of the plurality of map areas is provided with at least one reflective object.

15. The wearable device of claim 9, wherein when the environment information indicates that an environment area in the environment corresponding to one of the plurality of map areas in the map of the environment is a restricted area, the processor is configured to generate a warning message corresponding to the one of the plurality of map areas in an immersive content.

16. The wearable device of claim 15, further comprising:
   a display panel, coupled to the processor, wherein the processor is configured to control the display panel to display, so as to provide the immersive content.

17. The wearable device of claim 9, wherein the processor is configured to generate the map of the environment before determining the target map area in the map of the environment.

18. A non-transitory computer readable storage medium with a computer program to execute a localization method applicable to a wearable device, wherein the localization method comprises:
   obtaining an environment information related to an environment where the wearable device is;
   determining a target map area in a map of the environment comprising a plurality of map areas according to the environment information, which comprises:
      identifying one of the plurality of map areas based on the environment information; and
      regarding others of the plurality of map areas as the target map area; and
   locating the wearable device in the map of the environment by only using the target map area.

* * * * *